E. W. SMITH.
BUTT HOOK.
APPLICATION FILED JULY 14, 1908.
923,722.
Patented June 1, 1909.
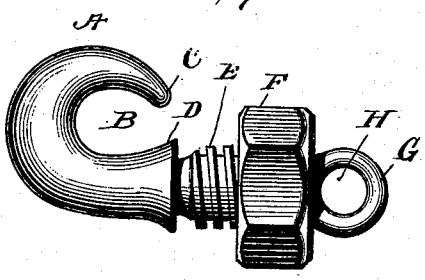
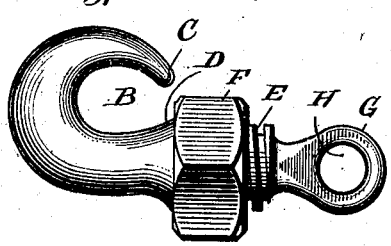
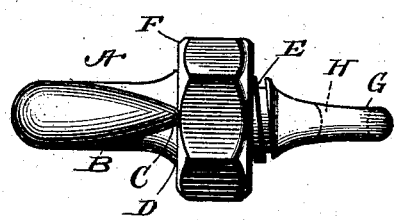
WITNESSES
INVENTOR
ERNEST W. SMITH,
BY
ATTORNEYS.

UNITED STATES PATENT OFFICE.

ERNEST WILLIAM SMITH, OF MYRTLE, OREGON.

BUTT-HOOK.

No. 923,722.　　　　Specification of Letters Patent.　　　　Patented June 1, 1909.

Application filed July 14, 1908.　Serial No. 443,468.

*To all whom it may concern:*

Be it known that I, ERNEST WILLIAM SMITH, a citizen of the United States, and a resident of Myrtle, in the county of Coos and State of Oregon, have made certain new and useful Improvements in Butt-Hooks, of which the following is a specification.

My invention relates to hooks and more especially to those hooks that are employed in connection with log cables or chains for the manipulation and transportation of logs in the process of manufacturing lumber. The hooks attached to the logging cables are commonly known as butt hooks. The ordinary butt hook consists of a shank having an eye at one end and a bent portion at the other end which constitutes the hook member. A short piece of wire cable is fastened to the hook and in use the cable is passed around the log and the hook is inserted into an eye spliced in the other end of the cable. It often happens that in the various movements of the log the cable becomes unfastened owing to the fact that the eye has slipped off the point of the hook. Various means have been devised for preventing this, and one object of my invention is to provide a device in which there is no possibility of the point of the hook being disengaged from the eye. To this end, I have provided a locking member on the hook which locks the eye so that it cannot be withdrawn or disengaged from the hook itself unless the locking member is moved. At the same time the locking member can be easily adjusted to permit the withdrawal of the cable.

My invention is illustrated in the accompanying drawings in which—

Figure 1 is a side view of my improved butt hook, showing the locking member in a retracted position; Fig. 2 is a similar view showing the locking member in its forward locking position; Fig. 3 is a plan view of the hook and locking member.

Referring now to Fig. 1, A denotes in general a hook having a loop B, adapted to permit the entrance of an eye of the logging cable. The hook terminates in a point C which is immediately opposite the shoulder D on the shank of the hook, the opening between these two members being just large enough to admit freely the eye of the cable. The shank of the hook has a threaded portion E and disposed on the threaded portion is a hexagonal nut F, having threads arranged to coöperate with the threads of the part E, thereby permitting the nut to be moved longitudinally of the shank into close engagement with the shoulder D.

When the nut F is moved into engagement with the shoulder D the opening between the end of the nut and the point C is too small to permit disengagement of the eye of the cable. If it is desirable the nut may be brought near enough so that the opening will be entirely closed.

The shank of the hook terminates in a flattened portion G which is made by spreading the cylindrical shank thereby forming a stop member which prevents the nut F from coming off. The flattened end portion G is perforated to form an eye H to which the end of the cable may be attached.

In the use of the hook the cable is placed around the log, in the manner already described, with the nut in the position indicated in Fig. 1, the cable eye inserted in the loop of the hook and the nut is then turned until it closes the opening between the members C and D. I prefer to have the nut of a hexagonal shape, although obviously it may have any other shape or may be milled on its outer circumference. In the preferred shape however, the nut may be screwed up tightly against the shoulder D by means of a wrench or other tool so that there will be no possibility of its coming loose and retracting far enough to permit the disengagement of the eye of the cable.

I am aware that there are certain forms of snap hooks which have a spring actuated locking member extending between the shank and the point of the hook, but one trouble with a device of this kind is that if the link is given a sudden blow in the reverse direction, that is toward the point of the hook, the light spring actuated member, or the point of the hook itself, as the case may be, is liable to be broken off and the cable to be disengaged.

My invention on the other hand, provides a locking member which in its locking position serves to receive the force of a reverse thrust and is of sufficient thickness as to prevent a breakage of the kind just referred to.

I claim:—

1. A butt hook, comprising a threaded cylindrical shank, an enlarged flattened head at one end of said shank provided with an eye, a hook member at the other end of said shank provided with a shoulder immediately adjacent to the threaded portion of said shank and terminating in a point opposite said shoulder, and a threaded nut disposed on said threaded shank and arranged to be moved longitudinally therealong, said nut being restricted in its movement in one direction by the enlarged head and being adapted to restrict the opening between the point of the hook and said shoulder when in engagement with said shoulder.

2. A butt hook, comprising a threaded shank having an enlarged flattened end portion provided with an eye, a nut disposed on said threaded shank and arranged for movement therealong, a hook member at one end of said shank having a shoulder and terminating in a point, said point being spaced apart from said shoulder to provide an opening into the loop of the hook.

3. A butt hook comprising a threaded shank terminating at one end in an enlarged head, a hook member at the other end of said shank bent to form a loop with a narrow opening, a stop, and a nut on said threaded shank arranged to be moved into engagement with said stop and to restrict the opening in the loop of said hook.

4. A butt hook comprising a threaded shank and an integral hook member, and means adjustable along said shank for locking said hook.

ERNEST WILLIAM SMITH.

Witnesses:
A. H. BENDER,
C. L. BENDER.